United States Patent Office 3,180,106
Patented Apr. 27, 1965

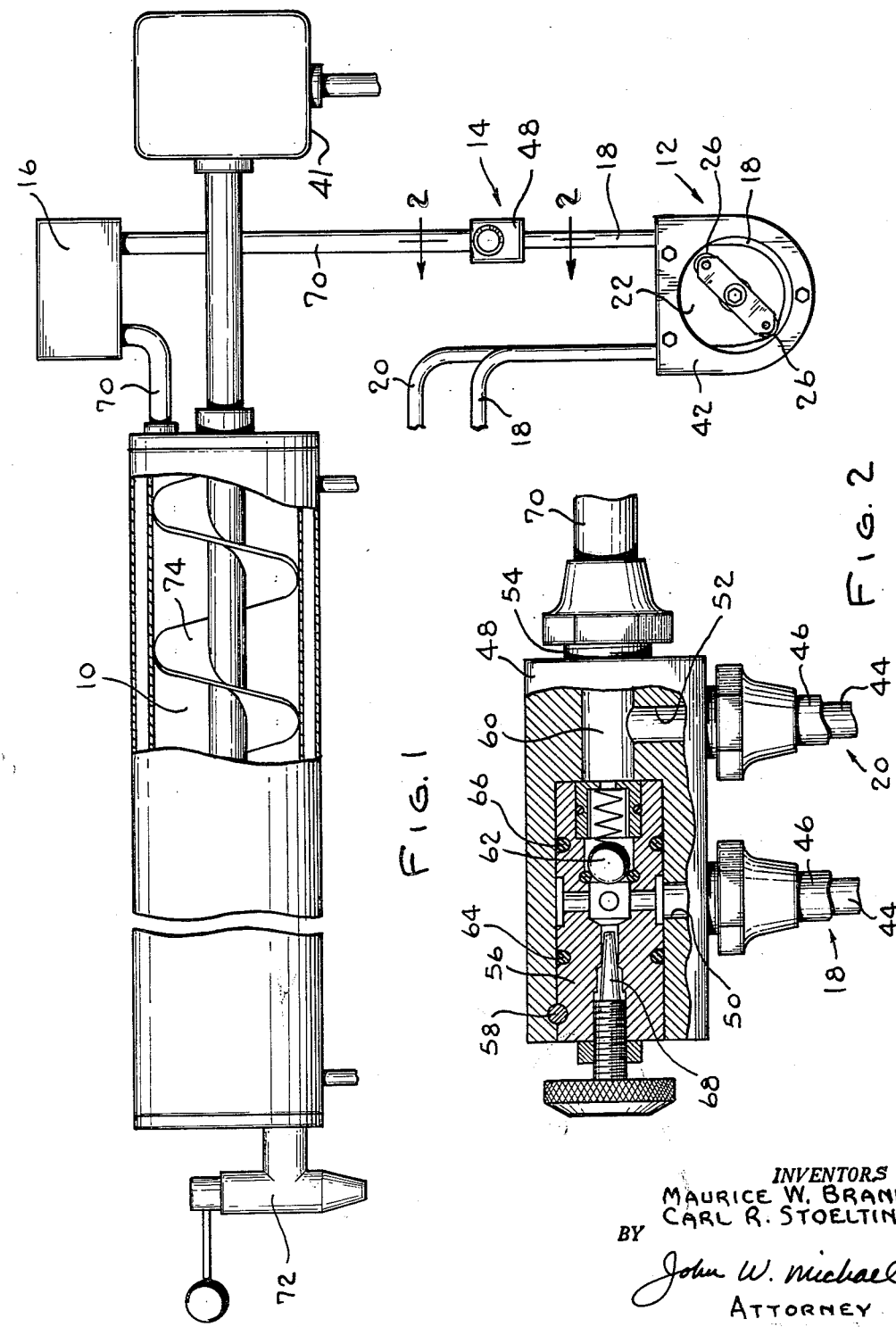

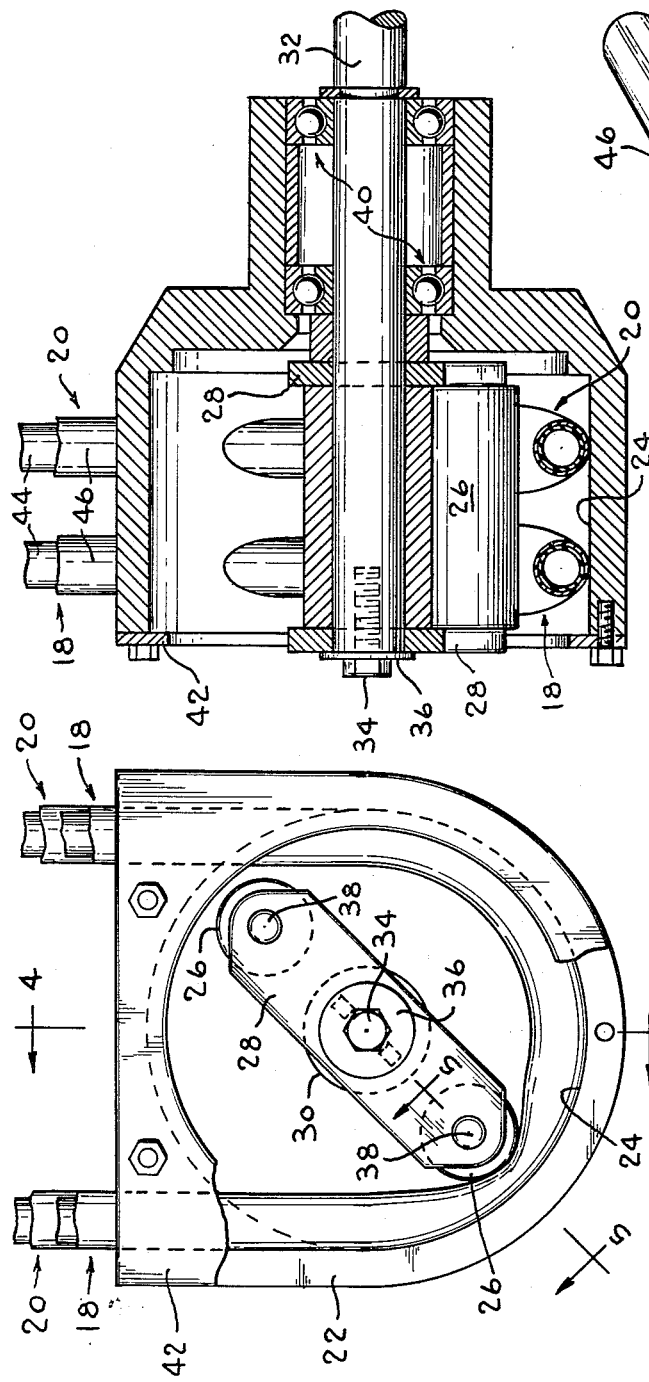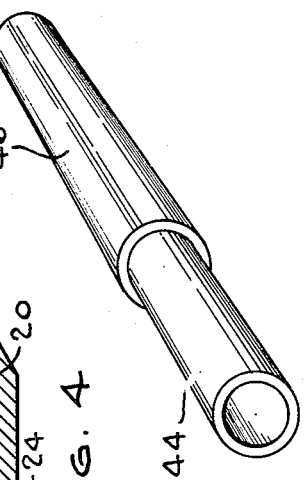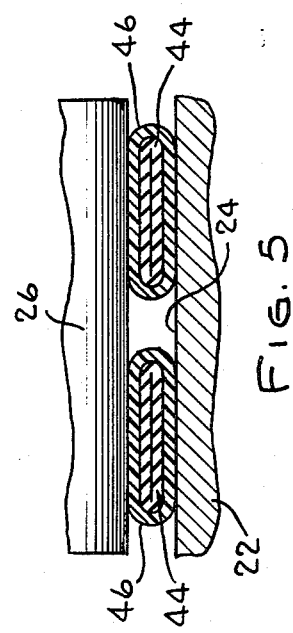

3,180,106
APPARATUS FOR MAKING A FROZEN
AERATED SOFT-SERVE PRODUCT
Maurice W. Brandt, Sheboygan, and Carl R. Stoelting, Kiel, Wis., assignors to Stoelting Brothers Company, Kiel, Wis., a corporation of Wisconsin
Filed Oct. 18, 1963, Ser. No. 317,273
5 Claims. (Cl. 62—177)

This invention relates to an improved method and apparatus for making a frozen soft-serve product. The term soft-serve product as used in this application includes any edible mix which is frozen with air entrained therein, and then served without additional hardening. The product commonly known as "frozen custard" is one example of a "soft-serve product."

The principal object of this invention is to provide an improved method and apparatus of the type specified which produces a soft serve product of a uniform consistency which can be accurately controlled and maintained.

Another object is to provide an improved soft serve mix pump design which operates with increased efficiency and durability at relatively high pressures.

Other objects and advantages will be pointed out in, or be apparent from the specification and claims, as will obvious modifications of the single embodiment shown in the drawings, in which:

FIG. 1 is a diagrammatic view of the apparatus of this invention with a part of the freezing chamber broken away;

FIG. 2 is a sectional view taken along line 2—2 of the air injection manifold shown in FIG. 1;

FIG. 3 is an enlarged side elevation view of the improved pump of this invention with parts broken away;

FIG. 4 is a sectional view of the pump taken along line 4—4 of FIG. 3;

FIG. 5 is a fragmentary sectional view taken along line 5—5 of FIG. 3; and

FIG. 6 is a perspective view of the double tube construction used in the improved pump of this invention.

Referring to FIG. 1 of the drawings, the apparatus of this invention includes a freezing chamber 10 into which an aerated soft serve mix is automatically supplied by means of a pump 12, an air injection manifold 14 and a pressure switch 16.

Air for aeration and the unaerated mix are supplied through a pair of separate conduits 18 and 20, respectively. A single pump 12 serves to pump both air and mix to injection manifold 14 wherein the desired amount of air is injected into the mix as will be described in detail hereinafter.

Pump 12 is comprised of a body 22 through which conduits 18 and 20 are passed through suitable openings in the wall of the body. Body 22 is formed with a curved inner surface 24 against which conduits 18 and 20 are positioned for rolling contact by rollers 26. Rollers 26 are mounted for rotation in a circular path by means of rotor arms 28 clamped in place at either end of a sleeve 30 on the end of a shaft 32 by a machine screw 34 and a washer 36, as shown in FIG. 4, or by any other suitable means. Rollers 26 are freely rotatably mounted on arms 28 by pins 38 and shaft 32 is rotated in ball bearing assembly 40 by a motor drive unit 41 of any suitable design. A removable cover plate 42 mounted on body 22 serves to retain the conduits in place inside the body.

The pressure requirements (up to about 50 p.s.i.) of the pumping system are such that the conduits 18 and 20 must be squeezed together tightly each time rollers 26 pass thereover as clearly seen in FIG. 5. To meet this requirement conduits 18 and 20 each include a soft flexible inner tube 44 which in the preferred embodiment has the following properties. First, it should be resistant to swelling action in the presence of animal oils and to absorption of water. Second, tube 44 must maintain good flexibility down to about 40° F., the pumping temperature of most soft serve mixes. Third, the tube should have good resilience, i.e. the ability to recover its size and shape after deformation. Fourth, it should be resistant to permanent set and have a high tensile strength. Fifth, it should be non-toxic, odorless and tasteless. The durometer of tube 44 should be between 40 to 50. If the durometer is higher the tube will become too stiff in use and its life will be shortened. While the above requirements may be provided to a greater or lesser degree by tubing materials of various types, particularly, good results may be obtained by an inner tube 44 made from natural gum (latex) or neoprene compounded to have properties similar to the natural gum material.

As indicated above, the inner tube must be sufficiently flexible to withstand a repeated tight squeezing action to produce the pressures required. It has been found, however, that an inner tube 44 having the above listed properties will not be strong enough to withstand the pressure requirements (50 p.s.i.). To overcome this problem the soft flexible inner tube 44 is encased in a tough but still flexible tube 46 which can withstand the pressure and the mechanical action of the rollers 26 but would not be able to operate efficiently if squeezed together tightly as will inner tube 44. In the preferred embodiment the outer tube 46 is made from pure vinyl. The wall thickness of the outer tube will vary depending on the particular pressure and temperature requirements of the installation involved. A suitable lubricant is used between the inner and outer tubes to minimize wear from the tube surfaces rubbing against each other.

The operating speed of pump 12 will vary depending upon the required pressure. For low pressures of up to about 20 p.s.i. speeds of 100 to 150 r.p.m. are sufficient. For pressures of from about 20–50 p.s.i. speeds of from 200–500 r.p.m. are required.

It is noted that pump 12 is designed to handle a pair of conduits 18 and 20. This arrangement makes it possible to simultaneously pump both air and mix and to accurately maintain a constant flow relationship between the two fluids to thus facilitate the maintenance of the proper air-to-mix ratio which, as previously indicated, is an important control factor in producing a frozen soft-serve product.

As previously stated, the operation of pump 12 will force air and mix to flow under pressure to injector manifold 14. As clearly shown in FIG. 2, manifold 14 is comprised of a main body member 48 having an air inlet 50, a mix inlet 52 and air-mix mixture outlet 54. An injector insert 56 is mounted in body 48 as shown and retained therein by a snap ring 58. Air entering body 48 through inlet 50 is directed to a mixing chamber 60 through a check valve 62 mounted in insert member 56. The check valve eliminates the possibility of the mix backing up into the air line 18 when the pump is not running. Insert 56 is sealed in body 48 by means of O-ring sealing members 64 and 66. Since different soft serve mixes may require different air-to-mix ratios it may be necessary to adjust the amount of air being injected into the soft serve mix. This is done by bleeding off the desired amount of air from manifold 14 by means of a needle valve 68 threadably mounted in injector insert 56 as shown.

Thus it is seen that the air and mix entering body 48 from lines 18 and 20, respectively, can be accurately mixed in chamber 60 which mixture is then carried from manifold 14 to pressure switch 16 and then to freezing chamber 10 by means of a single conduit 70. Pressure switch 16 is connected to the motor drive of pump 12 and operates in a conventional manner to cycle pump 12 on and off to thereby maintain a given pressure in chamber 10. A uniform pressure in chamber 10 is required to eliminate pulsing and flow variations from the dispensing spigot valve 72 at the outlet end of chamber 10.

The air-mix mixture pumped from manifold 14 to chamber 10 is thoroughly mixed by an auger 74 while being frozen. By the time the mixture reaches the outlet end of chamber 10 it has reached a suitable frozen consistency for use as a soft serve product and is then dispensed through spigot valve 72.

Although but one embodiment of the present invention has been illustrated and described, it will be apparent to those skilled in the art that various changes and modifications may be made therein without departing from the spirit of the invention or from the scope of the appended claims.

We claim:

1. Apparatus for making a frozen soft-serve product comprising:

a first conduit for carrying air therethrough;

a second conduit for carrying unaerated soft-serve mix therethrough;

a unitary pump means operatively connected to said first and second conduits for simultaneously forcing air and unaerated soft-serve mix through said first and second conduits;

an air injection manifold connected to said first and second conduits downstream of said pump means, said air injection manifold having a mixing chamber therein communicating with said first and second conduits;

a third conduit for carrying aerated soft-serve mix therethrough, said third conduit connected to said air injection manifold and communicating with said mixing chamber therein; and a freezing chamber means connected to said third conduit for receiving the aerated soft-serve mix from said air injection manifold, said freezing chamber means having a frozen soft-serve product outlet and a movable vane means mounted therein to force the aerated soft-serve mix through said freezing chamber means to said frozen soft-serve product outlet.

2. Apparatus according to claim 1 in which said pump means includes a pump body having a curved surface formed thereon against which said first and second conduits are positioned, compressing means including a roller member for simultaneously and progressively compressing both said conduits throughout at least a portion of the length thereof to thereby force fluids through said conduits.

3. Apparatus according to claim 1 in which said air injection manifold includes an adjustable bleed valve operative to bleed off a given amount of air from said first conduit to thereby accurately control the air-to-mix ratio.

4. Apparatus according to claim 3 in which said air injection manifold further includes a check valve to prevent back-up of mix into said first conduit when said pump means is not running.

5. Apparatus according to claim 1 in which there is a pressure responsive switch means connected to said third conduit and operative to control the operation of said movable vane means in said freezing chamber means.

References Cited by the Examiner
UNITED STATES PATENTS

| | | | |
|---|---|---|---|
| 2,278,340 | 3/42 | Weinreich et al. | 62—69 |
| 2,827,773 | 3/58 | Detjen | 62—342 X |
| 2,926,006 | 2/60 | Isreeli | 103—149 X |
| 2,944,487 | 7/60 | Walsh | 103—7 |
| 2,987,004 | 6/61 | Murray | 103—149 |
| 3,018,641 | 1/62 | Carpigiani | 62—342 |
| 3,105,447 | 10/63 | Ruppert | 103—149 |

ROBERT A. O'LEARY, *Primary Examiner.*